United States Patent [19]

Harada et al.

[11] Patent Number: 5,031,999
[45] Date of Patent: Jul. 16, 1991

[54] OPTICAL WAVELENGTH CONVERTER DEVICE

[75] Inventors: Akinori Harada; Chiaki Goto, both of Kanagawa, Japan

[73] Assignee: Fuji Photo Film Co., Ltd., Kanagawa, Japan

[21] Appl. No.: 523,693

[22] Filed: May 15, 1990

[30] Foreign Application Priority Data

May 15, 1989 [JP] Japan ................................. 1-121026
Apr. 16, 1990 [JP] Japan ................................. 2-99988

[51] Int. Cl.$^5$ ............................................. G02F 1/35
[52] U.S. Cl. ................................ 350/96.29; 307/430; 350/96.12; 350/96.15; 350/96.34
[58] Field of Search ............... 350/96.12, 96.13, 96.14, 350/96.15, 96.29, 96.30, 96.34; 307/425–430

[56] References Cited

U.S. PATENT DOCUMENTS

| | | | |
|---|---|---|---|
| 4,830,447 | 5/1989 | Kamiyama et al. | 350/96.12 |
| 4,838,638 | 6/1989 | Kamiyama et al. | 350/96.12 X |
| 4,865,406 | 9/1989 | Khanarian et al. | 350/96.12 |
| 4,874,221 | 10/1989 | Ohsawa | 350/96.29 |
| 4,893,888 | 1/1990 | Okazaki et al. | 350/96.12 |
| 4,909,595 | 3/1990 | Okazaki et al. | 350/96.29 |
| 4,923,277 | 5/1990 | Okazaki et al. | 350/96.29 |
| 4,952,013 | 8/1990 | Harada et al. | 350/96.30 |

Primary Examiner—John D. Lee
Attorney, Agent, or Firm—Sughrue, Mion, Zinn, Macpeak & Seas

[57] ABSTRACT

An optical wavelength converter device comprises a cladding and a waveguide disposed in the cladding. The waveguide is made of an organic nonlinear optical material such as PRA which has a first refractive index with respect to the wavelength of the wavelength-converted wave and a second refractive index with respect to the wavelength of the fundamental wave, the first refractive index being lower than the second refractive index. Alternatively, the first and second refractive indexes are substantially the same as each other, and the cladding is made of a material which has a third refractive index with respect to the wavelength of the wavelength-converted wave and a fourth refractive index with respect to the wavelength of the fundamental wave, the third refractive index being substantially the same as the fourth refractive index. The effective refractive index with respect to the fundamental wave which is guided in a zero-order mode and the effective refractive index with respect to the wavelength-converted wave which is guided in the zero-order mode are equal to each other.

5 Claims, 9 Drawing Sheets

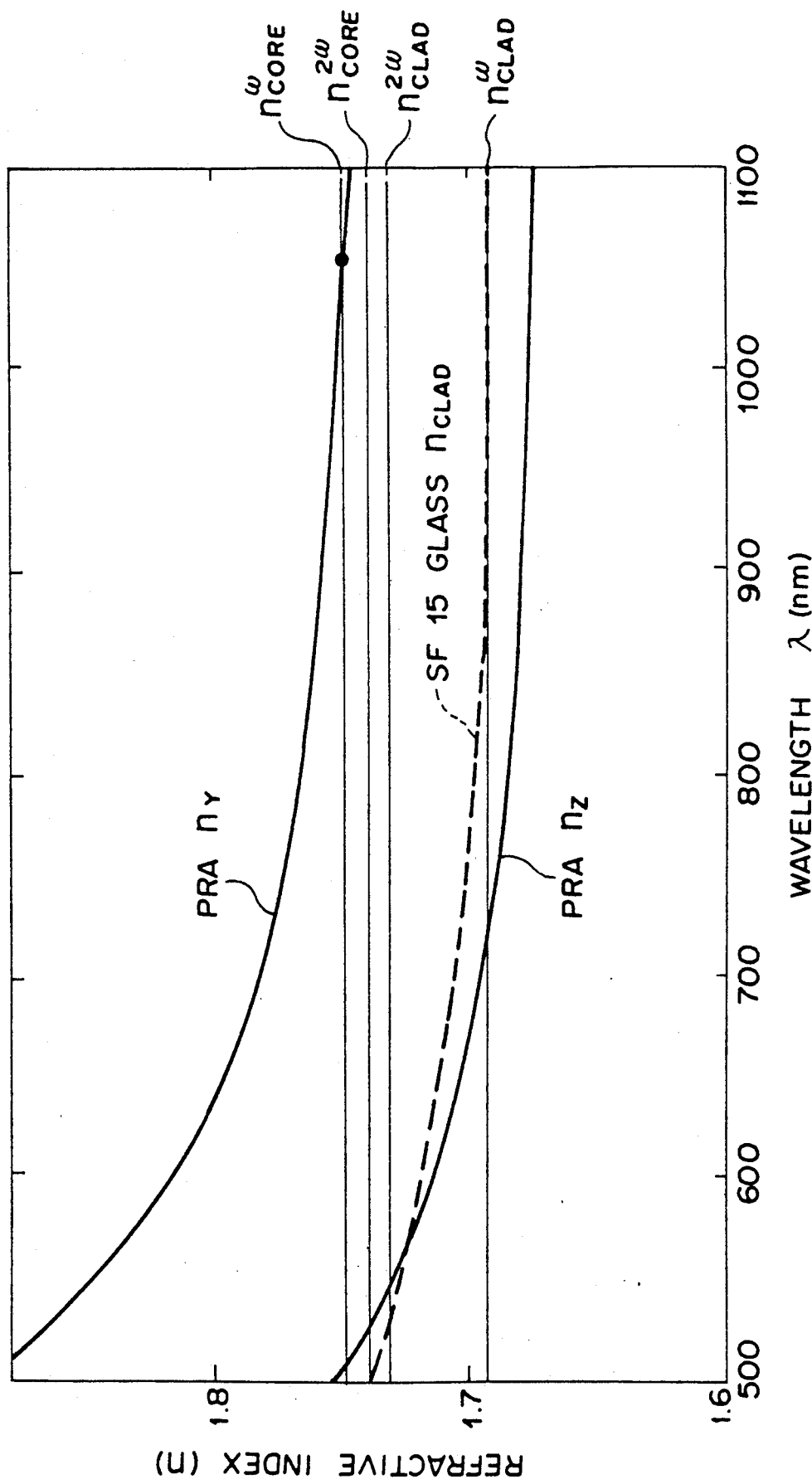

OPTICAL WAVELENGTH CONVERTER DEVICE

BACKGROUND OF THE INVENTION

1. Field of the Invention

The present invention relates to an optical wavelength converter device, more particularly, an optical wavelength converter device which comprises a cladding and a waveguide disposed in the cladding and made of a nonlinear optical material having a refractive index which is higher than that of the cladding, for achieving phase matching between a fundamental wave and a wavelength-converted wave which travel in guided modes.

2. Description of the Prior Art

Various attempts have heretofore been made to convert the wavelength of a laser beam into a second harmonic (i.e., to shorten the wavelength of a laser beam), using a nonlinear optical material. One well known example of an optical wavelength converter device for effecting such laser wavelength conversion is a bulk-crystal-type optical wavelength converter device. This optical wavelength converter device relies upon the birefringence of a crystal in order to meet phase matching conditions. Therefore, any material which does not exhibit birefringence or exhibits only small birefringence cannot be employed, even if it has high nonlinearity.

To solve the above problem, there has been proposed a fiber-type optical wavelength converter device. An optical wavelength converter device of this type is in the form of an optical fiber comprising a core made of a nonlinear optical material and surrounded by a cladding. One example of such an optical fiber is shown in Vol. 3, No. 2, pages 28-32, of the Bulletin of the Microoptics Research Group of a gathering of the Japan Society of Applied Physics. Recently, much effort has been directed to the study of a fiber-type optical wavelength converter device since it can easily achieve phase matching between a fundamental wave and a wavelength-converted wave. There is also known an optical wavelength converter device in the form of a two-dimensional optical waveguide sandwiched between two substrates which serve as a cladding and made of a nonlinear optical material, as disclosed in U.S. Pat. No. 4,820,011, for example. Another known optical wavelength converter device comprises a three-dimensional optical waveguide embedded in a glass substrate and made of a nonlinear optical material, for emitting a second harmonic into the glass substrate. These known optical wavelength converter devices are also capable of easily achieving phase matching between a fundamental wave and a wavelength-converted wave.

U.S. Pat. No. 4,952,013 shows in detail a fiber-type optical wavelength converter device which can generate sum and differential frequencies. The generation of sum and differential frequencies with a waveguide-type optical wavelength converter device is also disclosed in detail in U.S. Pat. No. 4,952,013 It is also possible to generate a third harmonic wave using tertiary nonlinearity.

The above optical-waveguide-type optical wavelength converter devices (including those of the fiber type) are roughly classified according to phase matching process, as follows:

(1) The Cerenkov-radiation type which achieves phase matching between a radiation mode in which a wavelength-converted wave is radiated into a cladding and a guided mode in which a fundamental wave is guided; and (2) The waveguide-waveguide type which achieves phase matching between a fundamental wave and a wavelength-converted wave which travel in guided modes.

Optical waveguide converter devices of the waveguide-waveguide type (2) can expect in principle higher wavelength conversion efficiency due to greater interaction between a fundamental wave and a wavelength-converted wave than optical waveguide converter devices of the Cerenkov type (1). More specifically, if it is assumed that the length of interaction (i.e., the length of the optical waveguide) is indicated by L, the wavelength conversion efficiency is proportional to L in the optical wavelength converter devices of the Cerenkov radiation-type, but is proportional to the square of L in the optical wavelength converter devices of the waveguide-waveguide-type.

According to an optical wavelength converter device of the Cerenkov radiation-type, a beam of a wavelength-converted wave which is emitted from the device has a ring or cresent cross-sectional shape, and a special focusing optical system is required to focus the wavelength-converted wave into a small spot. According to an optical wavelength converter device of the waveguide-waveguide-type, however, if a wavelength-converted wave is guided in a single mode, then an emitted beam thereof substantially becomes a Gaussian beam. Therefore, the wavelength-converted wave can simply be converted down to the diffraction limit.

Conventional optical wavelength converter devices of the waveguide-waveguide-type which have heretofore been proposed have waveguides made of an inorganic nonlinear optical material. Consequently, the diameter of the core or the thickness of the optical waveguide, and the wavelength of a fundamental wave to be applied should be controlled highly accurately in order to achieve desired phase matching. In addition, the temperature of the device should be set to 100° C. or higher and the device should be kept at that temperature within an error range of about ±0.1° C. in order to achieve phase matching after the wavelength-converted wave has been guided in a single mode. The optical wavelength converter devices of the waveguide-waveguide-type have not yet been practical because of the various conditions or factors which need to be controlled strictly, as described above.

SUMMARY OF THE INVENTION

It is an object of the present invention to provide an optical wavelength converter device of the waveguide-waveguide-type which has less strict conditions for phase matching and is sufficiently practical in use.

According to the present invention, a first optical wavelength converter device of the waveguide-waveguide-type is in the form of an optical waveguide which is made of an organic nonlinear optical material which has a first refractive index with respect to the wavelength of a wavelength-converted wave and a second refractive index with respect to the wavelength of a fundamental wave, the first refractive index being lower than the second refractive index, so that the effective refractive index with respect to the fundamental wave which is guided in a zero-order mode and the effective refractive index with respect to the wavelength-converted wave which is guided in the zero-order mode are equal to each other.

According to the present invention, a second optical wavelength converter device of the waveguide-waveguide-type comprises a cladding and a waveguide disposed in the cladding, the waveguide being made of a nonlinear optical material which has a first refractive index with respect to the wavelength of the wavelength-converted wave and a second refractive index with respect to the wavelength of the fundamental wave, the first refractive index being substantially the same as the second refractive index, the cladding being made of a material which has a third refractive index with respect to the wavelength of the wavelength-converted wave and a fourth refractive index with respect to the wavelength of the fundamental wave, the third refractive index being substantially the same as the fourth refractive index, whereby the effective refractive index with respect to the fundamental wave which is guided in a zero-order mode and the effective refractive index with respect to the wavelength-converted wave which is guided in the zero-order mode are equal to each other.

FIG. 5(b) of the accompanying drawings shows, by way of example, a mode dispersion in a conventional fiber-type optical wavelength converter device of the waveguide-waveguide-type. The mode dispersion shown is effected at normal temperature. An effective refractive index $n_{EFF}^{\omega}$ with respect to a fundamental wave which is guided through a core in a zero-order mode is of a value between a refractive index $n_{CLAD}^{\omega}$ of a cladding material and a refractive index $n_{CORE}^{\omega}$ of a core material with respect to the wavelength of the fundamental wave. An effective refractive index $n_{EFF}^{2\omega}$ with respect to a wavelength-converted wave (a second harmonic wave) which is guided through the core in the zero-order mode is of a value between a refractive index $n_{CLAD}^{2\omega}$ of the cladding material and a refractive index $n_{CORE}^{2\omega}$ of the core material with respect to the wavelength of the second harmonic wave. Since $$n_{CLAD}^{\omega} < n_{CLAD}^{2\omega} \text{ and}$$

$$n_{CORE}^{\omega} < n_{CORE}^{2\omega},$$

no core diameter exists which would satisfy the phase matching condition:

$$n_{EFF}^{\omega} = n_{EFF}^{2\omega} \tag{1}$$

in an optical wavelength converter device of the waveguide-waveguide-type, between the fundamental wave in the zero-order mode and the second harmonic wave in the zero-order mode.

At a temperature which is greatly different from the normal temperature, a core diameter can exist which satisfy the phase matching condition given by the above equation (1). In such a case, however, the temperature has to be controlled very strictly as described above. As shown in FIG. 5(b), a core diameter can exists which can satisfy the phase matching condition given by the equation (1), between the fundamental wave in the zero-order mode and the second harmonic wave in a higher-order mode (e.g., first-order mode). In this case, since two mode dispersion curves cross each other at portions where they are inclined at greatly different gradients, the above phase matching condition could not be met unless the core diameter were strictly set to a prescribed value. Furthermore, the beam of the second harmonic wave largely deviates from a Gaussian beam.

A mode dispersion in the first optical wavelength converter device (e.g., of the fiber-type) of the waveguide-waveguide-type according to the present invention is basically as shown in FIG. 5(a) at normal temperature. Specifically, refractive indexes of a cladding with respect to a fundamental wave and a second harmonic wave are related as follows:

$$n_{CLAD}^{\omega} < n_{CLAD}^{2\omega}$$

owing to the difference between the wavelengths of these waves, and refractive indexes of a core with respect to these waves are related as follows:

$$n_{CORE}^{\omega} < n_{CORE}^{2\omega}.$$

Therefore, a core diameter exists which can satisfy the phase matching condition expressed by the equation (1), between the fundamental wave in the zero-order mode. The two mode second harmonic wave in the zero-order mode. The two mode dispersion curves cross each other at portions where they have the same gradient, and hence these mode dispersion curves cross each other in a wider range. Accordingly, the phase matching condition is satisfied in a relative wide range of core diameters.

A mode dispersion in the second optical wavelength converter device (e.g., of the three-dimensional optical waveguide type) of the waveguide-waveguide-type according to the present invention is basically as shown in FIG. 5(c) at normal temperature. Specifically, the refractive indexes of cladding and the waveguide are related as follows:

$$n_{CLAD}^{\omega} = n_{CLAD}^{2\omega}, \text{ and}$$

$$n_{CORE}^{\omega} = n_{CORE}^{2\omega}.$$

The mode dispersion curves of the fundamental wave and the second harmonic wave in the zero-order mode cross each other in an almost full range. Therefore, the phase matching condition is satisfied without being limited by the layer thickness of the waveguide.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 4 is a graph showing the refractive-index dispersion characteristics of the core and cladding materials in the optical wavelength converter device according to the present invention;

DESCRIPTION OF THE PREFERRED EMBODIMENTS

Figure 1:
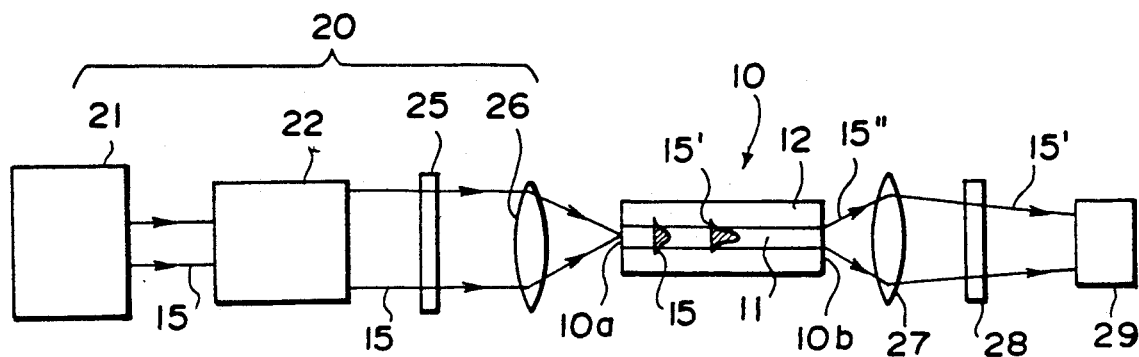
FIG. 1 is a schematic view of an optical wavelength converter device according to the present invention.

FIG. 1 shows an optical wavelength converter device 10 according to an embodiment of the present invention. The optical wavelength converter device 10 is in the form of an optical fiber which comprises a cladding 12 having a central hole and a core 11 of a nonlinear optical material filled in the central hole in the cladding 12. The nonlinear optical material of the core 11 comprises an organic nonlinear optical material which has a first refractive index with respect to the wavelength of a wavelength-converted wave and a second refractive index with respect to the wavelength of a fundamental wave, the first refractive index being lower than the second refractive index. In the illustrated embodiment, the organic nonlinear optical material is 3,5-dimethyl-1-(4-nitrophenyl)pyrazole (hereinafter referred to as "PRA"), as disclosed in Japanese Unexamined Patent Publication No. 62(1987)-210432. The cladding 12 is made of SF15 which is an amorphous material.

Figure 2:
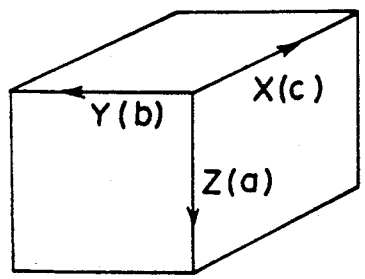
FIG. 2 is a schematic perspective view of a bulk crystal of PRA used as a core material in the optical wavelength converter device shown in FIG. 1.

The bulk-crystal structure of the PRA is shown in FIG. 2. The PRA crystal is of an orthorhombic system, and its point group is mm2. Therefore, the tensor of the nonlinear optical constants is as follows:

$$d = \begin{pmatrix} 0 & 0 & 0 & 0 & d_{15} & 0 \\ 0 & 0 & 0 & d_{24} & 0 & 0 \\ d_{31} & d_{32} & d_{33} & 0 & 0 & 0 \end{pmatrix}$$

If it is assumed that optical axes X, Y, Z are determined with respect to crystal axes a, b, c as shown in FIG. 2, then $d_{31}$ is a nonlinear optical constant for extracting a second harmonic wave which is Z-polarized when light which is linearly polarized in the direction X (X-polarized light) is applied as a fundamental wave. Similarly, $d_{32}$ is a non-linear optical constant for extracting a second harmonic wave which is Z-polarized when light which is linearly polarized in the direction Y (Y-polarized light) is applied as a fundamental wave. Likewise, $d_{33}$ is a nonlinear optical constant for extracting a second harmonic wave which is Z-polarized when light which is linearly polarized in the direction Z (Z-polarized light) is applied as a fundamental wave. $d_{24}$ is a nonlinear optical constant for extracting a Y-polarized second harmonic wave when Y- and Z-polarized fundamental waves are applied. $d_{15}$ is a nonlinear optical constant for extracting an X-polarized second harmonic wave when X- and Z-polarized fundamental waves are applied. The magnitudes of the respective nonlinear optical constants are given in the following table:

|          | (1) | (2)        |
|----------|-----|------------|
| $b_{21}$ | 26  | —          |
| $b_{32}$ | 160 | 240 ± 140  |
| $b_{32}$ | 67  | 70 ± 10    |
| $b_{15}$ | 26  | —          |
| $b_{24}$ | 160 | —          |

The values in the column (1) are obtained by the X-ray crystal structure analysis and the values in the column (2) are measured by the Marker Fringe process (both are of values in the unit of $[\times 10^{-9}$ esu$]$).

The above table clearly shows that the constants $d_{32}$, $d_{22}$, $d_{24}$ are of large values. Particularly, the constants $d_{32}$, $d_{24}$ are the largest next to one nonlinear optical constant $600 \times 10^{-9}$ esu of MNA (2-methyl-4-nitroaniline) disclosed in Japanese Unexamined Patent Publication No. 60(1985)-250334 and one nonlinear optical constant $200 \times 10^{-9}$ esu of NPP (N-(4-nitrophenyl)-L-prolinol) disclosed in J. Opt. Soc. Am. B. Vol. 4, page 977 (1987).

Figure 3:
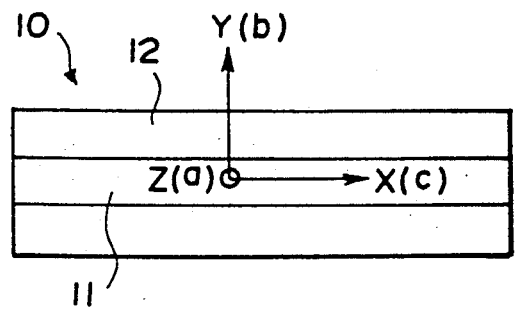
FIG. 3 is a schematic side elevational view showing the orientation of the crystal of the core.

To fill the core 11 of PRA in the cladding 12 to fabricate the fiber-type optical wavelength converter device 10, as shown in FIG. 3, the PRA crystal is oriented such that its c-axis (optical X-axis) extends in the direction of the core axis (such orientation is made possible by a process described below). The large nonlinear optical constants $d_{32}$, $d_{24}$ can be utilized when a fundamental wave which is linearly polarized in the direction of the a-axis (optical Z-axis) or the b-axis (optical Y-axis) of the PRA crystal is applied to the optical wavelength converter device 10.

The optical wavelength converter device 10 in the form of an optical fiber with the PRA crystal oriented as described above may be fabricated according to the process disclosed in Japanese Unexamined Patent Publication No. 64(1989)-73327, for example.

The optical wavelength converter device 10 will be used as shown in FIG. 1. A light source device 20 includes a light source for emitting a fundamental wave, which comprises a YAG laser 21. A laser beam (fundamental wave) 15 having a wavelength of 1064 nm emitted from the YAG laser 21 is increased in its beam diameter by a beam expander 22, and then passes through a λ/2 plate 25. The beam is then converted by a condenser lens 26 into a small beam spot which is applied to an entrance end 10a of the optical wavelength converter device 10. In this manner, the fundamental wave 15 enters the optical wavelength converter device 10. As described above, the PRA of the core 11 is of such a crystal orientation that the X-axis extends along the core axis. In the illustrated embodiment, the $\lambda/2$ plate 25 of the light source device 20 is rotated to apply the fundamental wave 15 which is Y-polarized to the optical wavelength converter device 10.

The core 11 has a diameter of 1.422 μm. The fundamental wave 15 which has entered the optical wavelength converter device 10 is guided through the core 11 in only a zero-order mode. The wavelength of the fundamental wave 15 is converted by the PRA of the core 11 into the waveguide of a second harmonic wave 15' having a wavelength (=532 nm) which is half that the wavelength of the fundamental wave 15. The second harmonic wave 15' is Z-polarized, and is guided in the core 11 in a single mode with only the zero-order mode being excited.

Phase matching of the second harmonic wave 15' will now be described below.

FIG. 4 shows the dispersion characteristics of refractive indexes $n_Y$, $n_Z$ of the PRA of the core 11 in the Y-axis and Z-axis directions, respectively, and a refractive index $n_{CLAD}$ of the SF15 glass of the cladding 12. The dispersion characteristics shown in FIG. 4 are obtained at 25° C. An effective refractive index $n_{EFF}^\omega$ with respect to the Y-polarized fundamental wave 15 which has a wavelength of 1064 nm is of a value between a value $n_{CLAD}^\omega$ of the refractive index $n_{CLAD}$ with respect to the wavelength of 1064 nm and a value $n_{CORE}^\omega$ of the refractive index $n_Y$ with respect to the wavelength of 1064 nm. An effective refractive index $n_{EFF}^{2\omega}$ with respect to the Z-polarized second harmonic wave 15' which has a wavelength of 532 nm is of a value between a value $n_{CLAD}^{2\omega}$ of the refractive index $n_{CLAD}$ with respect to the wavelength of 532 nm and a value $n_{CORE}^{2\omega}$ of the refractive index $n_Z$ with respect to the wavelength of 532 nm. As shown in FIG. 4, the refractive indexes of the cladding 12 are related to each other as follows:

$$n_{CLAD}^\omega < n_{CLAD}^{2\omega},$$

but the refractive indexes of the core 11 are related to each other as follows:

$$n_{CORE}^\omega > n_{CORE}^{2\omega}.$$

Figure 5A:
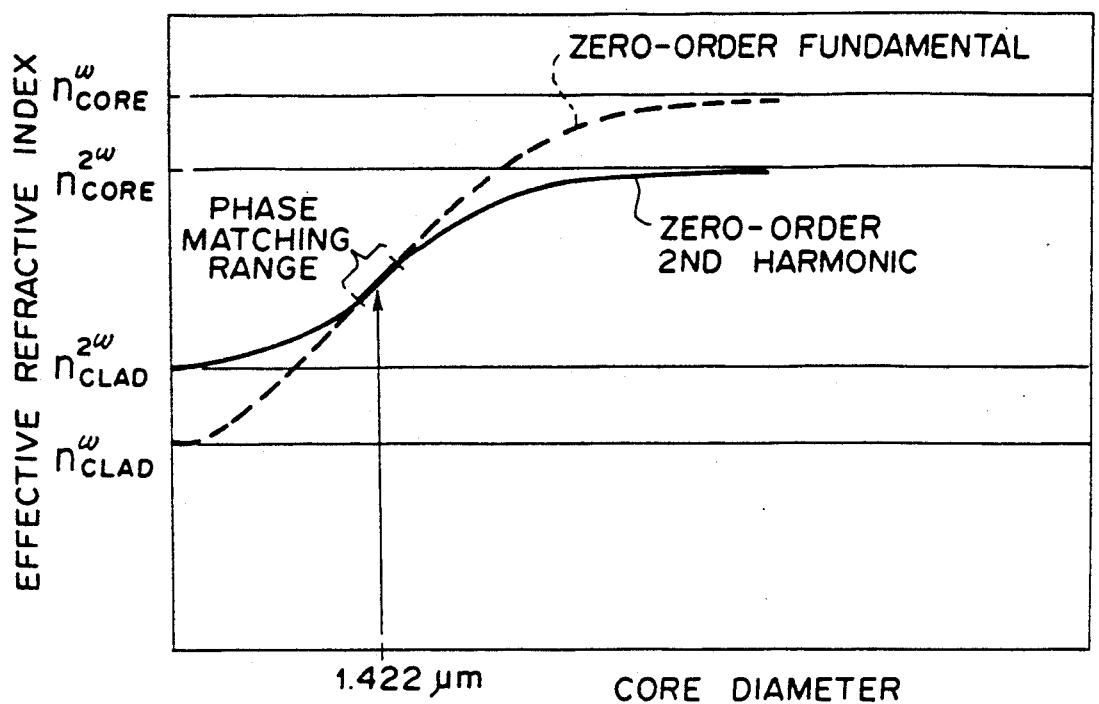
FIG. 5(a) is a graph showing a mode dispersion of a fundamental wave and a wavelength-converted wave in a first optical wavelength converter device according to the present invention.
Figure 5B:
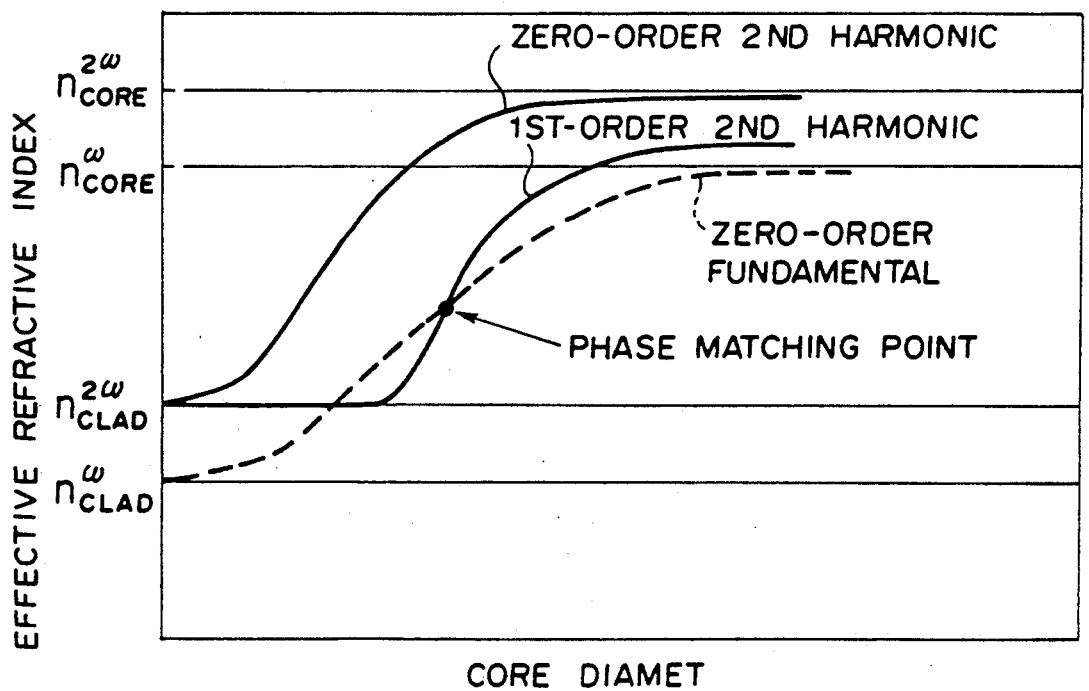
FIG. 5(b) is a graph showing a mode dispersion of a fundamental wave and a wavelength-converted wave in a conventional optical wavelength converter device of the waveguide-waveguide-type.
Figure 5C:
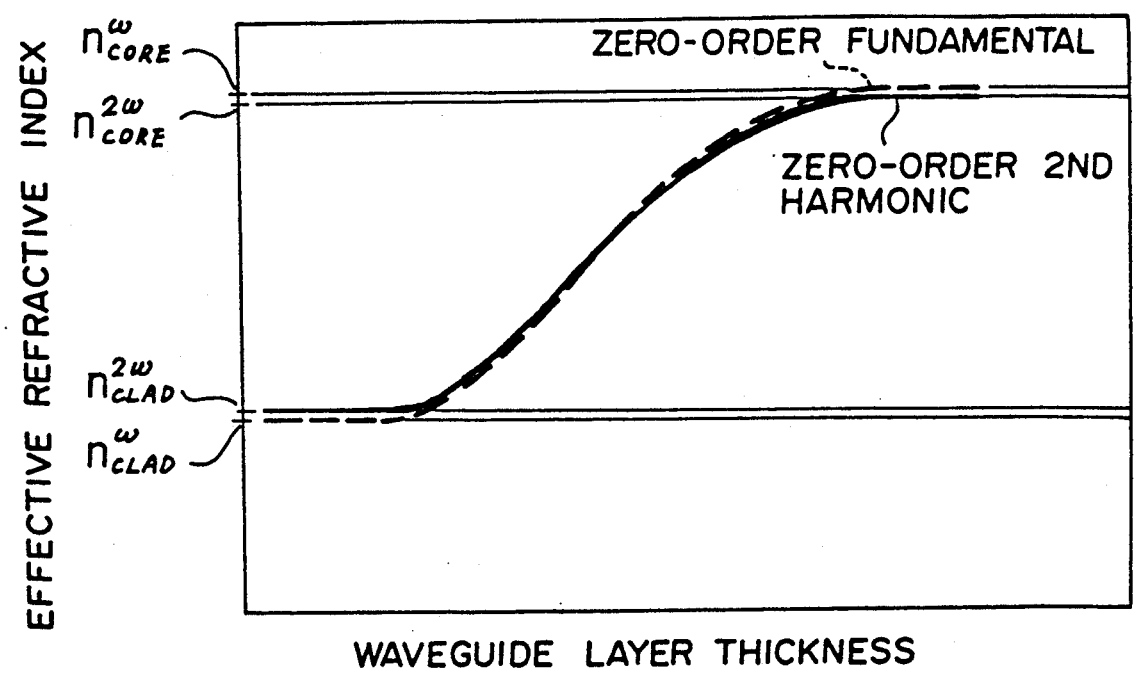
FIG. 5(c) is a graph showing a mode dispersion of a fundamental wave and a wavelength-converted wave in a second optical wavelength converter device according to the present invention.

At 25° C., the mode dispersion of the fundamental wave 15 and the second harmonic wave 15' is as shown in FIG. 5(a). The value of the core diameter (=1.422 μm) in the illustrated embodiment is substantially at the center of a range in which the dispersion curve of the fundamental wave 15 in the zero-order mode and the dispersion curve of the second harmonic wave 15' in the zero-order mode overlap each other. Therefore, the phase matching condition given by the equation (1):

$$n_{EFF}^\omega = n_{EFF}^{2\omega}$$

is satisfied, thereby achieving phase matching between the second harmonic wave 15' in the zero-order mode and the fundamental wave 15 in the zero-order mode.

A beam 15" which is a mixture of the second harmonic wave 15' and the fundamental wave 15 is emitted from an exit end 10b of the optical wavelength converter device 10. The emitted beam 15" is converged by a condenser lens 27 and then applied to a bandpass filter 28 which allows the second fundamental wave 15' of 532 nm to pass therethrough and absorbs the fundamental wave 15 of 1064 nm. Therefore, only the second harmonic wave 15' is extracted from the bandpass filter 28. Using a polarizer or the like, it was confirmed that the second harmonic wave 15' was Z-polarized light. In the embodiment, therefore, the nonlinear optical constant $d_{32}$ of the PRA is utilized. The light intensity of the second harmonic wave 15' was measured by a light power meter 29, and the wavelength conversion efficiency of the optical wavelength converter device 10 was about 10% in terms of 1 W conversion, when the length of the device was 5 mm.

Since the second harmonic wave 15' is guided in a single mode through the core 11, the second harmonic wave 15' emitted from the optical wavelength converter device 10 substantially becomes a Gaussian beam. It is therefore possible to converge the second harmonic wave 15' down to the diffraction limit using a general focusing optical system comprising a spherical lens.

For the reasons described above, the optical wavelength converter device according to the present invention can achieve the phase matching for high wavelength conversion efficiency even if the accuracy of the core diameter is relatively low.

Figure 6:
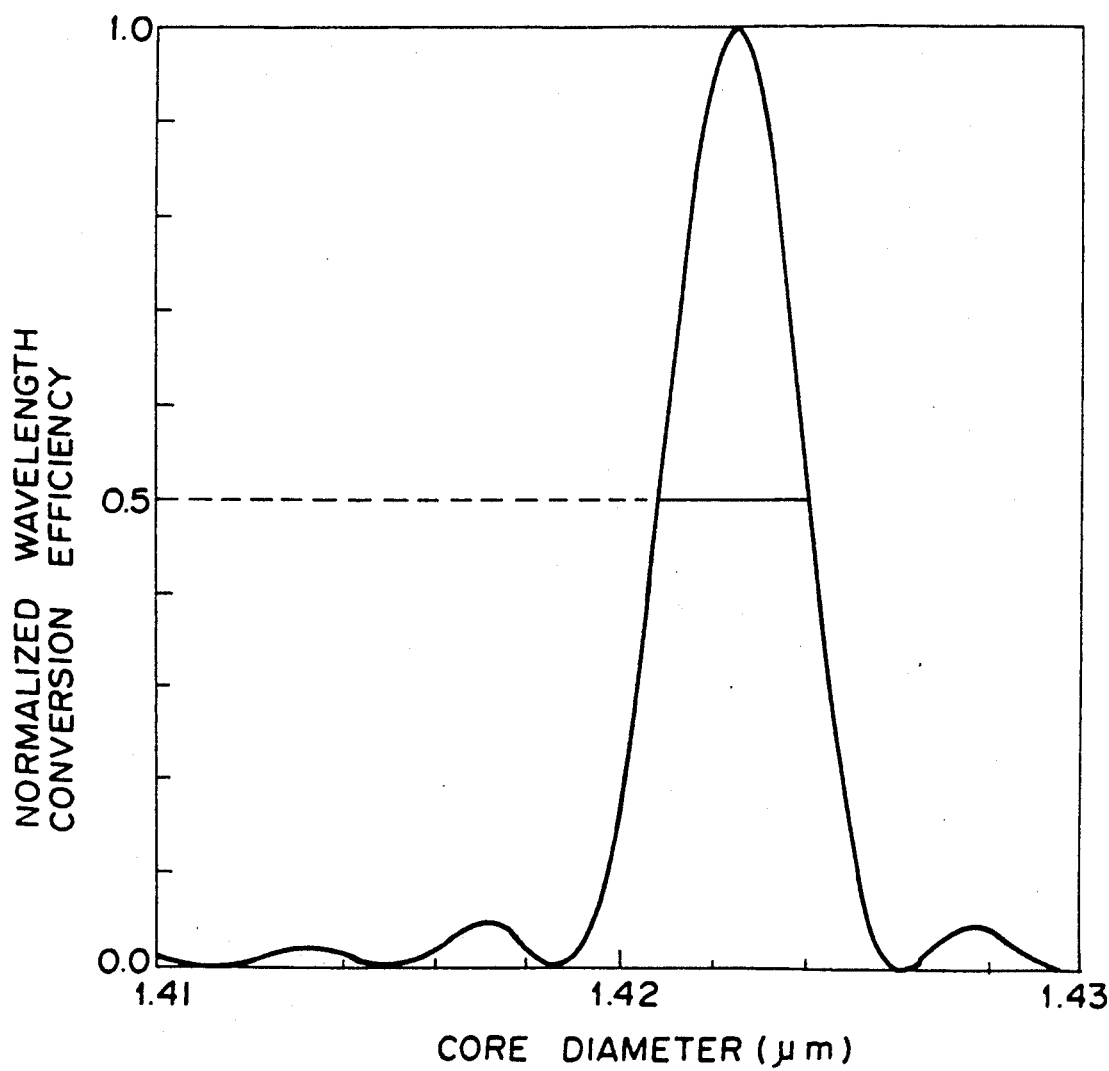
FIG. 6 is a graph showing the relationship between core diameters and wavelength conversion efficiencies (of a relative value) of the optical wavelength converter device according to the present invention.

FIG. 6 shows how the wavelength conversion efficiency varies when the core diameter of the optical wavelength converter device 10 varies. The wavelength conversion efficiency is indicated by relative values with respect to the value of 1 at the time the core diameter is of an ideal value (=1.422 μm). As shown in FIG. 6, the tolerance of the core diameter which assures ½ or more of the maximum value of the wavelength conversion efficiency is about ±2 nm. Optical fibers with core diameter errors in that tolerance range can be fabricated according to the present state of the art of optical fiber technology.

Figure 7:
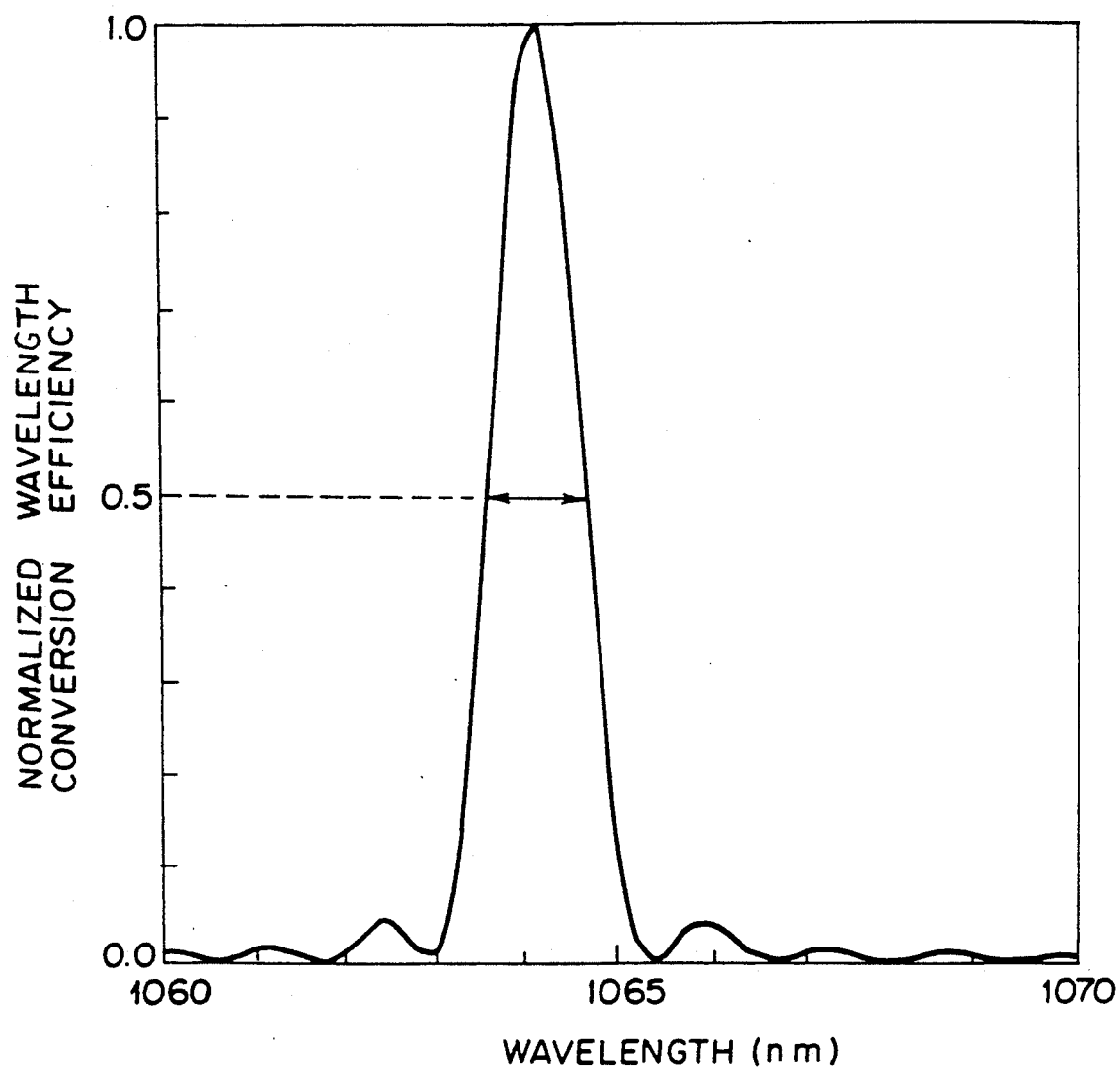
FIG. 7 is a graph showing the relationship between the wavelengths of a fundamental wave and the wavelength conversion efficiencies of the optical wavelength converter device according to the present invention.

FIG. 7 shows how the wavelength conversion efficiency varies when the fundamental wavelength varies. As illustrated in FIG. 7, the tolerance of the fundamental wavelength which assures ½ or more of the wavelength conversion efficiency at the time the fundamental wavelength is of an ideal value (=1064.0 nm) is about ±0.6 nm.

Figure 8:
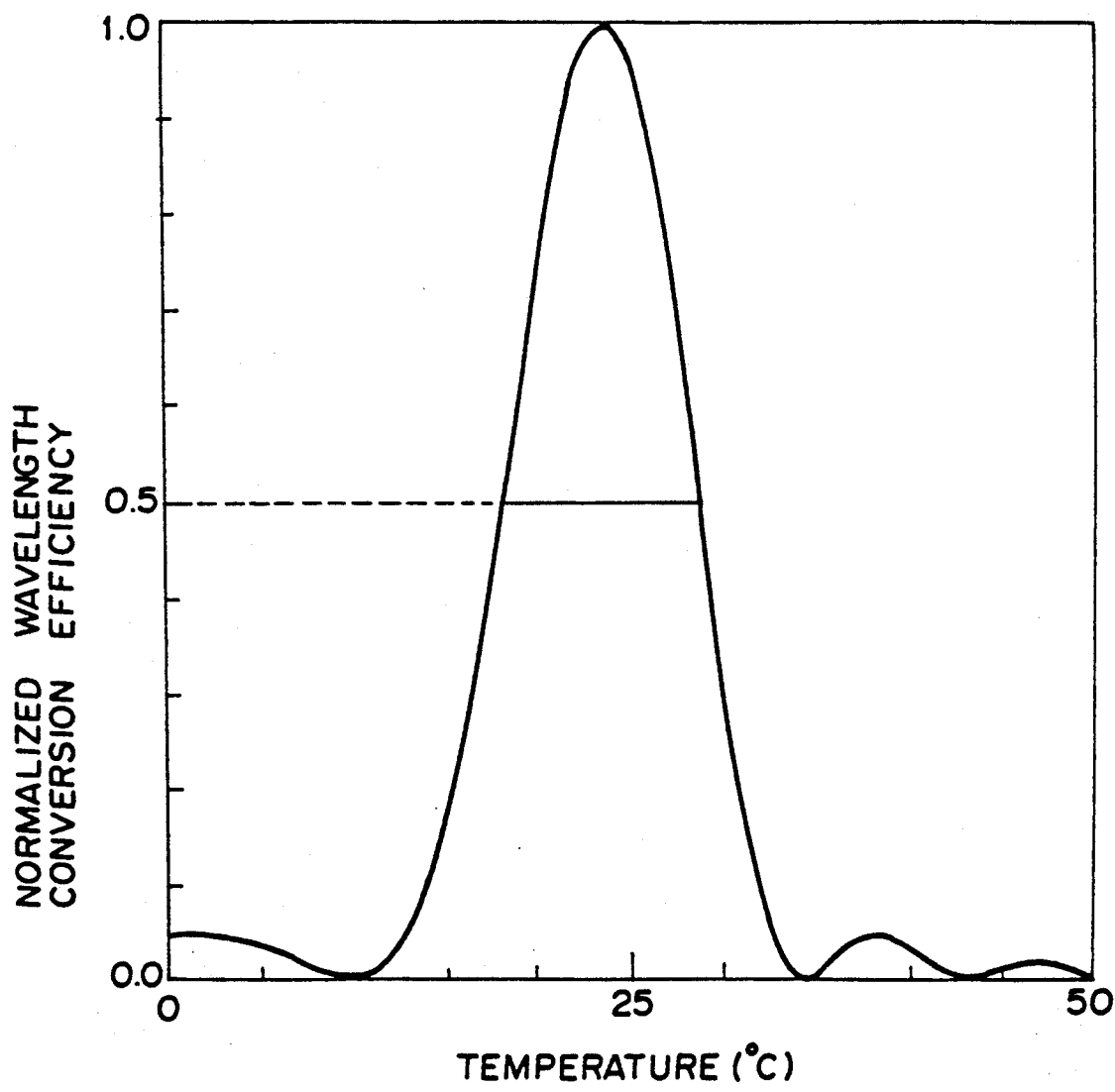
FIG. 8 is a graph showing the relationship between temperatures and the wavelength conversion efficiencies of the optical wavelength converter device according to the present invention.

FIG. 8 shows how the wavelength conversion efficiency varies when the temperature of the optical wavelength converter device varies. As shown in FIG. 8, the tolerance of the temperature which assures ½ or more of the wavelength conversion efficiency at the time the temperature is of an ideal value (=25° C.) is about ±5° C.

While the core 11 is made of PRA in the illustrated embodiment, the organic nonlinear optical material whose refractive index with respect to the wavelength of the wavelength-converted wave is lower than the refractive index with respect to the wavelength of the fundamental wave is not limited to PRA, but may be TRI disclosed in Japanese Unexamined Patent Publication No. 2(1990)-28. The cladding is also not limited to SF15 glass, but may be made of another amorphous material or crystal material. Use of an amorphous material is highly preferable in view of a greater choice available of refractive indexes and refractive index dispersions.

The optical wavelength converter device 10 of the illustrated embodiment is in the form of an optical fiber. However, the optical wavelength converter device according to the present invention may be in the form of a two- or three-dimensional optical waveguide.

An optical wavelength converter device according to another embodiment of the present invention will be described with reference to FIGS. 9 and 10. Those parts shown in FIGS. 9 and 10 which are identical to those of the previous optical wavelength converter device are denoted by identical reference numerals, and will not be described in detail below except when particularly required.

Figure 9:
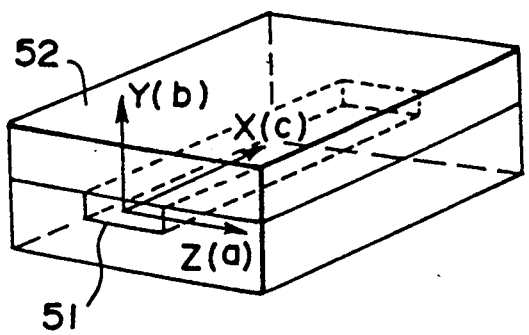
FIG. 9 is a perspective view of an optical wavelength converter device according to another embodiment of the present invention.
Figure 10:
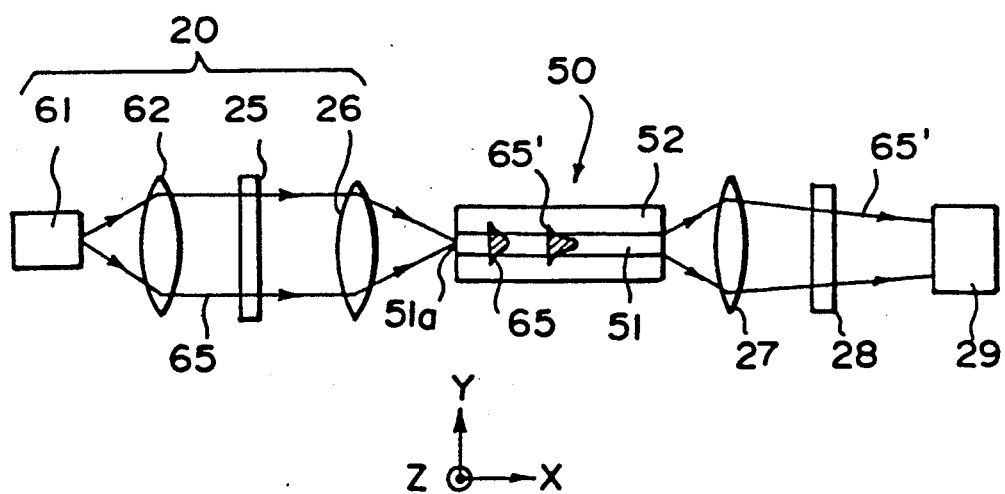
FIG. 10 is a schematic view showing the manner in which the optical wavelength converter device shown in FIG. 9 operates.

The optical wavelength converter device, generally denoted at 50 in FIGS. 9 and 10, is of the three-dimensional optical waveguide type which includes a three-dimensional optical waveguide 51 made of PRA which is embedded in a cladding (substrate) 52 that is made of aromatic polyamide exhibiting birefringence.

The crystal of the PRA, of which the optical waveguide 51 is made, is oriented such that it has a c-axis (optical X-axis) extending in the direction in which the waves are guided, i.e., in the longitudinal direction of the waveguide, an a-axis (optical Z-axis) extending perpendicularly to the sheet of FIG. 10, and a b-axis (optical Y-axis) extending vertically in FIG. 10. Such an axis orientation is obtained when the aspect ratio of the optical waveguide 51 is suitably selected.

The aromatic polyamide, of which the cladding 52 is made, is arranged such that two of its optical axes extend parallel to the Y- and Z-axes, respectively, of the PRA. The aromatic polyamide has a refractive index $n_{CLAD}(Y)$ with respect to light which is polarized in the same direction as the Y-axis and a refractive index $n_{CLAD}(Z)$ with respect to light which is polarized in the same direction as the Z-axis.

The optical wavelength converter device 50 is used as shown in FIG. 10. A semiconductor layer 61 is employed as a light source for emitting a fundamental wave. A divergent laser beam (fundamental wave) 65 having a wavelength of 980 nm emitted from the semiconductor layer 61 is converted by a collimator lens 62 into a parallel beam, which passes through a λ/2 plate 25. The laser beam is then converted by a condenser lens 26 into a small beam spot which is applied to an entrance end 51a of the optical waveguide 51. In this manner, the fundamental wave 65 enters the optical wavelength converter device 50. In this embodiment, the λ/2 plate 25 is also rotated to apply the fundamental wave 65 which is Y-polarized to the optical wavelength converter device 50.

The fundamental wave 65 which has entered the optical waveguide converter device 50 is guided through the optical waveguide 51 in only a zero-order mode. The wavelength of the fundamental wave 65 is converted by the PRA of the optical waveguide 51 into the waveguide of a second harmonic wave 65' having a wavelength (=490 nm) which is half that the wavelength of the fundamental wave 65. The second harmonic wave 65' is Z-polarized, and is guided in the optical waveguide 51 in a single mode with only the zero-order mode being excited.

Phase matching of the second harmonic wave 65' will now be described below.

Figure 11:
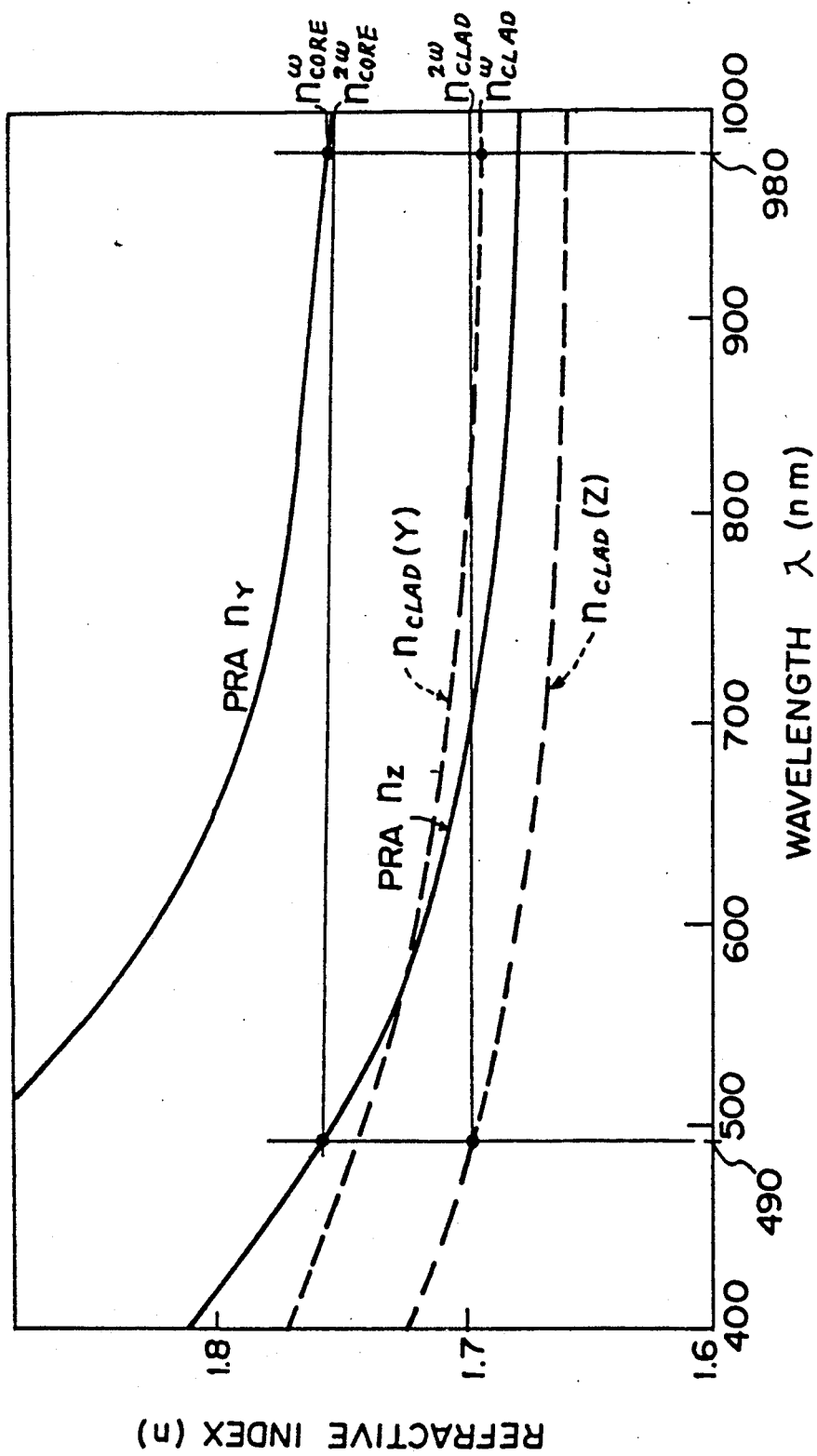
FIG. 11 is a graph showing the refractive-index dispersion characteristics of the waveguide and cladding materials in the optical wavelength converter device shown in FIG. 9.

FIG. 11 shows the dispersion characteristics of refractive indexes $n_Y$, $n_Z$ of the PRA of the optical waveguide 51 in the Y-axis and Z-axis directions, respectively, and the refractive indexes $n_{CLAD}(Y)$, $n_{CLAD}(Z)$ of the aromatic polyamide of the cladding 62. The dispersion characteristics shown in FIG. 11 are obtained at 25° C. An effective refractive index $n_{EFF}^\omega$ with respect to the Y-polarized fundamental wave 65 which has a wavelength of 980 nm is of a value between a value $n_{CLAD}^\omega$ of the refractive index $n_{CLAD}(Y)$ with respect to the wavelength of 980 nm and a value $n_{CORE}^\omega$ of the refractive index $n_Y$ with respect to the wavelength of 980 nm. An effective refractive index $n_{EFF}^{2\omega}$ with respect to the Z-polarized second harmonic wave 65' which has a wavelength of 490 nm is of a value between a value $n_{CLAD}^{2\omega}$ of the refractive index $n_{CLAD}(Z)$ with respect to the wavelength of 490 nm and a value $n_{CORE}^{2\omega}$ of the refractive index $n_Z$ with respect to the wavelength of 490 nm. In the illustrated embodiment, the refractive indexes of the cladding 52 and the waveguide 51 are related as follows:

$$n_{CLAD}^\omega \simeq n_{CLAD}^{2\omega} \text{ (both are about 1.69), and}$$

$$n_{CORE}^\omega \simeq n_{CORE}^{2\omega} \text{ (both are about 1.78).}$$

At 25° C., the mode dispersion curves of the fundamental wave 65 and the second harmonic wave 65' cross each other in an almost full range as shown in FIG. 5(a). Therefore, the phase matching condition:

$$n_{EFF}^\omega = n_{EFF}^{2\omega}$$

is satisfied without being limited by the layer thickness of the waveguide, so that phase matching is achieved between the second harmonic wave 65' in the zero-order mode and the fundamental wave 65 in the zero-order mode.

In the optical wavelength converter device 10 according to the previous embodiment, the tolerance of the core diameter which assures ½ or more of the maximum value of the wavelength conversion efficiency is about ±2 nm, as described above. According to the embodiment shown in FIGS. 9 and 10, the tolerance of the layer thickness of the optical waveguide for the same wavelength conversion efficiency achievement is much greater, i.e., about ±50 nm.

The illustrated optical wavelength converter devices according to the present invention convert a fundamental wave into a second harmonic. However, the optical wavelength converter devices may be arranged to convert fundamental waves into a wave which has a frequency equal to the difference between or the sum of the frequencies of the fundamental waves.

With the present invention, as described above, the first optical wavelength converter device has a waveguide which is made of an organic nonlinear optical material whose refractive index with respect to the wavelength of a wavelength-converted wave is lower than the refractive index with respect to the wavelength of a fundamental wave, and effective refractive indexes with respect to the fundamental wave and the wavelength-converted wave which are guided in a zero-order mode are the same as each other. It is possible to achieve phase matching between the fundamental wave and the wavelength-converted wave while the diameter and thickness of the waveguide are being dimensioned with a practical accuracy level.

The second optical wavelength converter device according to the present invention has a waveguide which is made of an organic nonlinear optical material whose refractive index with respect to the wavelength of a wavelength-converted wave is substantially the same as the refractive index with respect to the wavelength of a fundamental wave, and a cladding which is made of a material whose refractive index with respect to the wavelength of a wavelength-converted wave is substantially the same as the refractive index with respect to the wavelength of a fundamental wave, with effective refractive indexes with respect to the fundamental wave and the wavelength-converted wave which are guided in a zero-order mode, being the same as each other in a wide range. It is possible to achieve phase matching between the fundamental wave and the wavelength-converted wave while the diameter and thickness of the waveguide are being dimensioned with a lower accuracy level.

The optical wavelength converter devices according to the present invention can achieve the phase matching between the fundamental wave and the wavelength-converted wave at normal temperature. Since the waveguide of the optical wavelength converter devices is made of an organic nonlinear optical material, the effective refractive indexes thereof with respect to the fundamental wave and the wavelength-converted wave are subject to smaller variations or changes in response to changes in the temperature and the fundamental wavelength than the conventional waveguide-waveguide-type optical wavelength converter device whose waveguide is made of an inorganic material. Accordingly, even if the accuracy with respect to the temperature and the fundamental wavelength is lower than that for the conventional optical wavelength converter device, the desired phase matching can be achieved.

The optical wavelength converter devices according to the present invention can achieve phase matching between the fundamental wave and the wavelength-converted wave which is guided in a single mode. Therefore, the wavelength-converted wave which is emitted from the device substantially becomes a Gaussian beam, and hence can be converged down to the diffraction limit using a focusing optical system which comprises a general spherical lens.

Although certain preferred embodiments have been shown and described, it should be understood that many changes and modifications may be made therein without departing from the scope of the appended claims.

What is claimed is:

1. An optical wavelength converter device comprising:
   (i) a cladding; and
   (ii) a waveguide disposed in said cladding, said waveguide being made of a nonlinear optical material which has a refractive index larger than the refractive index of said cladding, for converting the wavelength of a fundamental wave guided in said waveguide, while achieving phase matching between a wavelength-converted wave and the fundamental wave which travel through said waveguide in a guided mode;
   (iii) said nonlinear optical material comprising an organic nonlinear optical material which has a first refractive index with respect to the wavelength of the wavelength-converted wave and a second refractive index with respect to the wavelength of the fundamental wave, said first refractive index being lower than said second refractive index;
   (iv) whereby the effective refractive index with respect to the fundamental wave which is guided in a zero-order mode and the effective refractive index with respect to the wavelength-converted wave which is guided in the zero-order mode are equal to each other.

2. An optical wavelength converter device according to claim 1, wherein said organic nonlinear optical material is 3,5-dimethyl-1-(4-nitrophenyl)pyrazole.

3. An optical wavelength converter device comprising:
   (i) a cladding; and
   (ii) a waveguide disposed in said cladding, said waveguide being made of a nonlinear optical material which has a refractive index larger than the refractive index of said cladding, for converting the wavelength of a fundamental wave guided in said waveguide, while achieving phase matching between a wavelength-converted wave and the fundamental wave which travel through said waveguide in a guided mode;
   (iii) said nonlinear optical material comprising an organic nonlinear optical material which has a first refractive index with respect to the wavelength of the wavelength-converted wave and a second refractive index with respect to the wavelength of the fundamental wave, said first refractive index being substantially the same as said second refractive index;
   (iv) said cladding being made of a material which has a third refractive index with respect to the wavelength of the wavelength-converted wave and a fourth refractive index with respect to the wavelength of the fundamental wave, said third refractive index being substantially the same as said fourth refractive index;
   (v) whereby the effective refractive index with respect to the fundamental wave which is guided in a zero-order mode and the effective refractive index with respect to the wavelength-converted wave which is guided in the zero-order mode are equal to each other.

4. An optical wavelength converter device according to claim 3, wherein said organic nonlinear optical material is 3,5-dimethyl-1-(4-nitrophenyl)pyrazole.

5. An optical wavelength converter device according to claim 3, wherein the material of said cladding is aromatic polyamide.

* * * * *